United States Patent
Kasperchik et al.

(10) Patent No.: US 8,454,737 B2
(45) Date of Patent: Jun. 4, 2013

(54) INK COMPOSITION

(75) Inventors: Vladek Kasperchik, Corvallis, OR (US); Jayprakash C. Bhalt, Corvallis, OR (US); Vladimir Jakubek, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 13/230,789

(22) Filed: Sep. 12, 2011

(65) Prior Publication Data
US 2013/0065031 A1    Mar. 14, 2013

(51) Int. Cl.
*C09D 11/10* (2006.01)
*C09D 11/12* (2006.01)

(52) U.S. Cl.
USPC ............. 106/31.61; 106/31.62; 106/31.63; 106/31.9; 523/160

(58) Field of Classification Search
USPC ........ 106/31.61, 31.62, 31.63, 31.9; 523/160; 347/100; 428/195.1
See application file for complete search history.

(56) References Cited

U.S. PATENT DOCUMENTS

| | | | |
|---|---|---|---|
| 5,912,280 A | 6/1999 | Anton et al. | |
| 6,499,839 B1 * | 12/2002 | Busby et al. | 347/96 |
| 6,908,186 B2 | 6/2005 | Zheng et al. | |
| 7,348,365 B2 | 3/2008 | Lee et al. | |
| 7,387,669 B2 * | 6/2008 | Mronga et al. | 106/31.6 |
| 7,612,124 B2 | 11/2009 | Polk et al. | |
| 7,691,196 B2 * | 4/2010 | Pfaff et al. | 106/31.9 |
| 7,699,921 B2 | 4/2010 | Watanabe et al. | |
| 7,732,509 B2 | 6/2010 | Madaras | |
| 7,803,221 B2 * | 9/2010 | Magdassi et al. | 106/31.9 |
| 2004/0109958 A1 * | 6/2004 | Nigam et al. | 428/32.1 |
| 2004/0152819 A1 | 8/2004 | Cuch | |
| 2006/0027137 A1 * | 2/2006 | Smith | 106/31.6 |
| 2007/0022901 A1 * | 2/2007 | Kurze et al. | 106/31.9 |
| 2007/0281136 A1 * | 12/2007 | Hampden-Smith et al. | 428/195.1 |
| 2008/0210122 A1 * | 9/2008 | Magdassi et al. | 106/31.05 |
| 2011/0122180 A1 | 5/2011 | Cook et al. | |
| 2012/0098248 A1 * | 4/2012 | Kasperchik et al. | 283/72 |
| 2012/0147108 A1 * | 6/2012 | Ganapathiappan et al. | 347/102 |

FOREIGN PATENT DOCUMENTS

WO    WO 2011/028201    3/2011

* cited by examiner

*Primary Examiner* — Helene Klemanski
(74) *Attorney, Agent, or Firm* — Sandra B. Beccarelli

(57) ABSTRACT

Ink composition that includes from about 0.1 to about 10 wt % of metal oxide pigment particles, having an average particle size in the range of about 3 to about 300 nm, that are dispersed with polyether alkoxysilane dispersants; and from about 0.01 to about 3 wt % of water-soluble amphiphilic polymers or of water-dispersible polymer waxes, based on the total weight of the ink composition. Said ink composition forms, onto printable media, a printed feature that exhibits a metallic appearance. Also described herein are the resulting printed article and the method to produce it.

18 Claims, 3 Drawing Sheets

INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

As expanded colors and appearances are sought for home and office decorative printing, developments have been made to provide inkjet prints with specific features, such as, for examples, metallic appearance or reflectivity Inks and printed articles, with such specific features, are noticeably limited among available options due, for example, to the cost or to the ineffectiveness for home and office use. Accordingly, investigations continue into developing ink compositions that exhibit, when printed, specific properties such as, for example, metallic appearance as well as excellent printing properties, such as water-fastness.

BRIEF DESCRIPTION OF THE DRAWING

The drawings illustrate various embodiments of the present article and are part of the specification.

DETAILED DESCRIPTION

Figure 1:
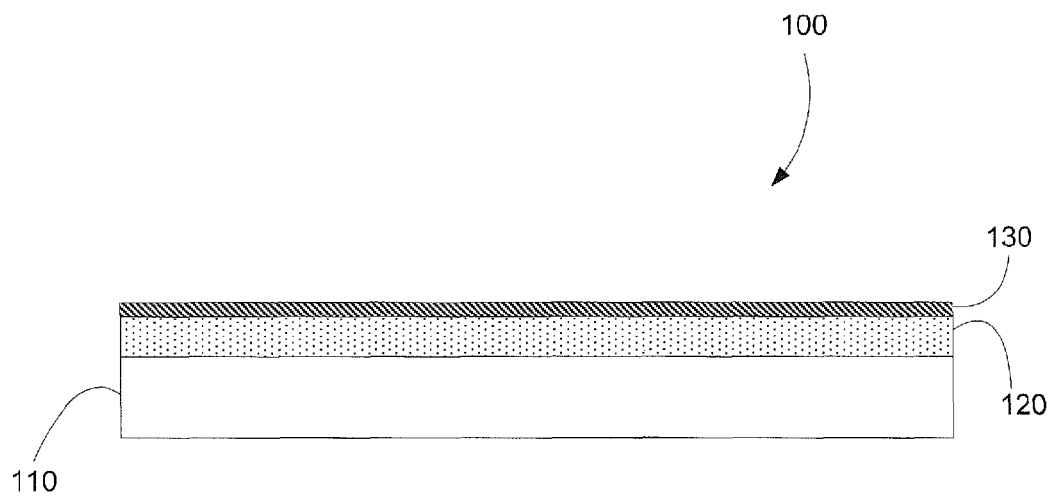
FIG. 1, FIG. 2, FIG. 3 and FIG. 4 are cross-sectional views of a printed article according to some embodiments of the present disclosure.

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Thus, for example, reference to "a particle" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated.

The present disclosure refers to an ink composition containing from about 0.1 to about 10 wt % of metal oxide pigment particles, having an average particle size in the range of about 3 to about 300 nm, dispersed with polyether alkoxysilane dispersants and from about 0.01 to about 3 wt % of water-soluble amphiphilic polymers or of water-dispersible polymer waxes, based on the total weight of the ink composition.

Also, disclosed herein is a printed article with metallic appearance on which a printed feature is formed with said ink composition. The present disclosure refers to a method for producing such printed article. The printed article encompasses a printable media, on which a printed feature is formed with an ink composition that contains from about 0.1 to about 10 wt % of metal oxide pigment particles, having an average particle size in the range of about 3 to about 300 nm, dispersed with polyether alkoxysilane dispersants, and from about 0.01 to about 3 wt % of water-soluble amphiphilic polymers or of water-dispersible polymer waxes. Said printable media encompasses a supporting substrate and an ink-absorbing layer with pore diameters smaller than the size of the metal oxide pigment particles.

The ink composition forms, on the printable media, a coating with strong metallic reflective appearance. Said coating can be defined as the printed feature. The resulting printed article exhibits therefore a metallic luster and gold-like appearance. By "metallic luster", it is meant, herein, that the printed article has an opaque or a semi-opaque appearance and reflects the light as a metal reflects it. The printed article interacts with the light and has a shiny metal appearance. The printed article has thus specific optical properties: it exhibits a sort of glow from reflected light and has the tendency to reflect at specular angle when exposed to directional light source. The ink composition described herein forms thus, on the printable media, a uniform coating with strong sparkling effect and with a metallic reflective appearance. In some examples, when iron oxide (Fe3O4) pigment particles are used in the ink composition, the printed article exhibits a gold-like appearance. By "gold-like appearance", it is meant herein that the printed article has a visual appearance of gold-plated surface and has the color of metallic gold (Au). However, the printed article does not contain any gold or other elemental metal particles. The printed article presents thus gloss, sheen and color as a gold object does.

In addition, the ink composition, described herein, presents improved waterfastness properties. This means thus that printed article, produced with the ink composition such as described herein, can be resistant to damages that can result from the use and application of water. Furthermore, ink compositions, described herein, demonstrate good jetting reliability when printed from both piezo- and thermal inkjet printheads.

Printed articles produced with the said metal oxide ink compositions, on media substrates, have, thus, an attractive look (metallic when printing with conductive oxides like magnetite or highly reflective when using transparent metal oxides with high refractive index). Furthermore, printed articles have good waterfastness properties, i.e. the surface of the print is not seriously damaged upon water exposure. The printed article exhibits a good water resistance.

The ink composition contains a dispersion of metal oxide pigment particles. Such metal oxide pigment particles have an average particle size in the range of about 3 to about 300 nm. In some examples, metal oxide pigment particles have an average particle size that is between about 5 and about 150 nm; in some other examples, that is between about 10 and about 100 nm, and, in yet other examples, that is between about 5 and about 80 nm.

Metal oxide pigment particles include metal oxide pigments selected from the group consisting of titanium dioxide ($TiO_2$), in rutile or anatase crystalline form, zinc oxide (ZnO), indium oxide ($In_2O_3$), manganese oxide ($Mn_3O_4$) and iron oxide ($Fe_3O_4$). In some examples, the metal oxide pigment particles are iron oxide ($Fe_3O_4$) or manganese oxide ($Mn_3O_4$). In some other examples, the ink composition contains iron oxide pigment particles ($Fe_3O_4$). As "iron oxide", it is meant herein any chemical compounds composed of iron and oxygen. The term iron oxides encompasses iron oxides, iron hydroxides or oxide/hydroxides. Examples of iron oxides include iron (II) oxide (wüstite, FeO); iron (II, III) oxide (magnetite, $Fe_3O_4$) and iron (III) oxide (hematite, $Fe_2O_3$). Examples of iron hydroxides include iron (II) hydroxide ($Fe(OH)_2$) and iron (III) hydroxide ($Fe(OH)_3$). Without being linked by any theory, it is believed that magnetite ($Fe_3O_4$) and hematite ($Fe_2O_3$) are oxidatively stable in aqueous environment; however, wüstite (FeO) is oxidatively unstable and can readily revert to $Fe_2O_3$ or $Fe_3O_4$.

The ink composition can contain stable colloidal dispersions of inorganic iron oxide particles, such as magnetite ($Fe_3O_4$) and hematite ($Fe_2O_3$). In some examples, the ink composition contains magnetite ($Fe_3O_4$) as iron oxide pigment particles. In some other examples, the ink composition contains an ink vehicle and a colloid dispersion of iron oxide particles ($Fe_3O_4$). The ink composition can contain an amount of metal oxide pigment, such as $Fe_3O_4$, that is between 0.1 and 10 wt % of the total weight of the ink composition. In some examples, the metal oxide pigment particles are present in an amount representing from about 1 to about 6 wt %, or, are present in an amount representing from about 2 to about 4 wt % of the total weight of the ink composition.

Some metal oxide pigment particles may have a light reflective behavior that is similar to that of metals: when printed, inks based on dispersions of these materials may form coatings with reflectivity up to 20% (or even higher) and with a visual appearance of metallic films. When printed articles are made with an ink composition containing $Fe_3O_4$ particles, such printed articles may have visual appearance of gold.

The metal oxide pigment particles are dispersed in a liquid vehicle in view of forming an ink composition that is suitable for inkjet printing. As used herein, "liquid vehicle" is defined to include any liquid composition that is used to carry the metal oxide pigment particles to the media substrate. A wide variety of liquid vehicle components may be used herein. Such liquid vehicle may include a mixture of a variety of different agents, including without limitation, surfactants, solvent and co-solvents, buffers, biocides, viscosity modifiers and water. In some examples, the liquid vehicle is an inkjet aqueous liquid vehicle. Organic solvents can be part of the liquid vehicle. Any suitable organic solvents can be used. Examples of suitable classes of organic solvents include polar solvents such as amides, esters, ketones, lactones and ethers. Examples of organic solvents also include N-methylpyrrolidone (NMP), dimethyl sulfoxide, sulfolane, and glycol ethers. The solvent can be used in an amount representing from about 0.1 to about 30 wt % of the ink composition or can be used in an amount representing from about 8 to about 25 wt % of the ink composition.

The ink composition can include water. Such water can be used as the ink carrier for the composition and can be part of the liquid vehicle. The water can make up the balance of the ink composition, and may be present in an amount representing from about 40 to about 95% by weight of the total composition. In addition to water, various types of agents may be employed in the ink composition to optimize the properties of the ink composition for specific applications. The ink composition may also include any number of buffering agents and/or biocides. Examples of suitable biocides include, but are in no way limited to, benzoate salts, sorbate salts, commercial products such as Nuosept® (ISP), Ucarcide® (Dow), Vancide® (RT Vanderbilt Co.) and Proxel® (Avecia), Kordek® MLX (Rohm and Haas) and other known biocides. Such biocides may be contained in amount representing less than about 5 weight percentage of the ink composition. Surfactants can also be used and may include water-soluble surfactants such as alkyl polyethylene oxides, alkyl phenyl polyethylene oxides, polyethylene oxide (PEO) block co-polymers, acetylenic PEO, PEO esters, PEO amines, PEO amides, dimethicone copolyols, ethoxylated surfactants, fluorosurfactants and mixtures thereof. In some examples, fluorosurfactants or ethoxylated surfactants can be used as surfactants. In some other examples, ethoxylated silicone based surfactants are used. If used, the surfactant can be present at from about 0.001 to about 10 wt % and, in some examples, can be present at from about 0.001 to about 0.1 wt % of the ink composition.

The metal oxide pigment particles, present in the ink composition, are dispersed with dispersants. Such dispersants are polyether alkoxysilane dispersants. Examples of suitable polyether alkoxysilanes include $HO(CH_2CH_2O)_{n'}$—$Si(OCH_3)_3$; $HO$—$(CH_2CH_2O)_{n'}$—$Si(OCH_2CH_3)_3$; $CH_3O$—$(CH_2CH_2O)_{n'}$—$Si(OCH_3)_3$; $CH_3O(CH_2CH_2O)_{n'}$—$Si(OCH_2CH_3)_3$; $C_2H_5O$—$(CH_2CH_2O)_{n'}$—$Si(OCH_3)_3$; $C_2H_5O$—$(CH_2CH_2O)_{n'}$—$Si(OCH_2CH_3)_3$; $HO$—$(CH_2CH(CH_3)O)_{n'}$—$Si(OCH_3)_3$; $HO$—$(CH_2CH(CH_3)O)_{n'}$—$Si(OCH_2CH_3)_3$; $CH_3O(CH_2CH(CH_3)O)_{n'}$—$Si(OCH_3)_3$; $CH_3O$—$(CH_2CH(CH_3)O)_{n'}$—$Si(OCH_2CH_3)_3$; $CH_3O$—$(CH_2CH_2O)_{n'}$—$Si(CH_3)(OCH_3)_2$; $CH_3O$—$(CH_2CH_2O)_{n'}$—$Si(CH_3)_2(OCH_3)$; $CH_3O(CH_2CH_2O)_{n'}$—$Si(CH_3)(OC_2H_5)_2$; $CH_3O(CH_2CH_2O)_{n'}$—$Si(CH_3)_2(OC_2H_5)$ wherein n' is an integer equal to 2 or greater. In some examples, n' is an integer ranging from 2 to 30 and, in some other examples, n' is an integer ranging from 5 to 15. Commercial examples of the polyether alkoxysilane dispersants include, but are not limited to, Silquest® A-1230 manufactured by Momentive Performance Materials, and Dynasylan® 4144 manufactured by Evonik/Degussa. The amount of dispersant may vary from about 1 wt % to about 300 wt % of the dispersed metal oxide pigment particles content. In some examples, the dispersant content range is between about 2 and about 150 wt %, or, in some other examples, is between about 5 and about 100 wt % of the metal oxides particles content.

Dispersion of metal oxide pigment particles are prepared via milling or via dispersing metal oxide pigment powder, in water, in the presence of suitable dispersants. The ink composition can be based on fine particles of iron oxide dispersion, such as $Fe_3O_4$, in an aqueous ink vehicle. The iron oxide, such as $Fe_3O_4$ pigment dispersion, may be prepared by milling commercially available inorganic oxide pigment having large particle size (in the micron range) in the presence of the dispersants described above until the desired particle size is achieved. The starting dispersion to be milled is an aqueous dispersion with solid content up to 40 wt % of the metal oxide pigment. The milling equipment that can be used is a bead mill, which is a wet grinding machine capable of using very fine beads having diameters of less than 1.0 mm as the grinding medium, for example, Ultra-Apex Bead Mills from Kotobuki Industries Co. Ltd. The milling duration, rotor speed and temperature may be adjusted to achieve the results desired.

The pH of the ink composition may be in the range of about 3 to about 11. In some examples, the pH of the ink is from about 5 to about 9 or from about 5.5 to about 9.0. The pH of the ink composition may be adjusted by addition of organic or inorganic acids or bases, i.e. pH adjusting agent. The ink composition can have a viscosity within the range of about 1.0 to about 10 cps, or within the range of about 1.0 to about 7.0 cps, as measured at 25° C. The ink composition contains from about 0.01 to about 3 wt % of water-soluble amphiphilic polymers or of water-dispersible polymer waxes. In some embodiments, the ink composition contains water-soluble amphiphilic polymers that are present in an amount ranging from about 0.01 to about 1 wt % based on the total weight of the ink composition. Water-soluble amphiphilic polymers can also be present in an amount ranging from about 0.01 to about 0.5 wt % or in an amount ranging from about 0.05 to about 0.2 wt % of the total weight of the ink composition. In some other embodiments, the ink composition contains water-dispersible polymer waxes that are present in an amount ranging from about 0.1 to about 3 wt % based on the total weight of the ink composition.

Structure of water-soluble amphiphilic polymers includes hydrophilic and hydrophobic chain segments. When present in the aqueous ink formulation as a dissolved species, these components undergo so-called micro-phase separation. The hydrophobic segments form compact hydrophobic domains, while hydrophilic segments are solvated by water and enable solubility of the component in the bulk ink. Amphiphilic polymers may form kind of micelle structures in the solutions where hydrophobic segments are locked inside micelle interior while hydrophilic parts of the molecules are exposed to the aqueous environment outside. Without being linked by any theory, it is believed that the drying of the metal oxide ink, on print substrate, leads to phase inversion of the amphiphilic additive. The use of such polymer actively contributes to make surface of the print hydrophobic and improve its water-fastness. Water-soluble amphiphilic polymers can be polyurethane polymers additives and/or styrene-acrylate co-polymers additives.

In some embodiments, water-soluble amphiphilic polymers are polyurethane polymers additives. Polyurethane polymers can be linear segmented co-polymers joined by urethane links and can be formed through step-growth polymerization, mainly by reacting a monomer containing at least two isocyanate functional groups with another monomer containing at least two alcohol groups in the presence of a catalyst. Such polyurethane additives can be capable of surfactant-like behavior in aqueous solutions. In addition to segments produced by reaction of diols with diisocyanates, polyurethane polymers can also have segments based on acid bearing monomers (hydrophilic blocks). These segments enable moderate to good solubility of the additive in water-based formulations. Polyurethane polymers additives can include polyether polyols, aliphatic isocyanates and acid groups. The polyether polyol can be a difunctional polyether polyol such as polyethylene glycol (PEG), polypropylene glycol (PPG) and polytetramethylene glycol (PTMG). The aliphatic-isocyanate can be hexamethylene isophorone diisocyanate (IPDI), diisocyanate-1,6 (HDI), 4,4-dicyclohexyl-methane-diisocyanate (H12-MDI), cyclohexane diisocyanate (CHDI), tetramethylxylene diisocyanate (TMXDI), and 1,3-bis(isocyanatomethyl)cyclohexane (H6XDI). In some examples, polyurethane additives include polytetramethylene glycol (PTMG) as the polyether polyol, isophorone diisocyanate (IPDI) as aliphatic isocyante and dimethylolpropionic acid (DMPA) as acid group. Water-soluble amphiphilic polyurethane polymers can have an average molecular weight ranging from about 1,000 to about 500,000 and an acid number in the range of about 10 to about 150 mg KOH/g polymer. In some other examples, the polyurethane polymers additives have an average molecular weight ranging from about 2,000 to about 200,000 or ranging from about 5,000 to about 100,000. In yet some other examples, the acid number of the polyurethane polymers additives is in the range of about 20 to about 100 or, in the range of about 30 to about 75. The acid number is expressed in milligrams (mg) of KOH required to neutralize one gram (g) of the polymer. In some embodiments, the ink composition encompasses water-soluble amphiphilic polymers that are amphiphilic polyurethane polymers additives having an average molecular weight ranging from about 5,000 to about 100,000 and an acid number in the range of about 30 to about 75 mg KOH/g polymer.

In some other embodiments, the water-soluble amphiphilic polymers are water-soluble styrene-acrylate co-polymers. Styrene-acrylate co-polymer encompasses a styrene co-polymer, an acrylic acid or acrylate co-polymer, a methacrylic acid or methacrylate co-polymer, derivatives thereof, or combinations thereof. The water-soluble amphiphilic polymers can be styrene-acrylic acid co-polymer (or ester thereof). The water-soluble amphiphilic polymers can be also styrene-acrylate co-polymers, a styrene-acrylic acid co-polymer or derivatives thereof. In some examples, styrene-acrylic acid co-polymers are selected from the group consisting of styrene-acrylic acid co-polymers, styrene-acrylic acid-methacrylic acid co-polymers and styrene-acrylic acid-methacrylic acid-butyl acrylate co-polymers. Any of these polymers and co-polymers could include derivatives thereof, such as one of the related esters (e.g., acrylates of varying ester groups, metacrylates with varying ester groups, etc. . . . ). Styrene-acrylate co-polymers can have hydrophobic styrene-based blocks and hydrophilic blocks containing acidic moieties of acrylic nature, such as for examples, acrylic or methacrylic acid. Said styrene-acrylate co-polymers can have an acid number that is above 100 mg KOH/g of polymer. In some examples, the acid number of the styrene-acrylate co-polymers is between 100 and 225 mg KOH/g of polymer. Styrene-acrylate co-polymers can have an average molecular weight that is in the range of about 3,000 to 3000,000 Mw, or, in the range of about 10,000 to 100,000 Mw. In some examples, the styrene-acrylic acid co-polymer or ester thereof can be present in an amount representing from about 0.01 to about 1 wt % of the total weight of the ink composition. Examples of co-polymers that can be used include Joncryl® co-polymers available from Johnson Polymers. Examples of these polymers include Joncryl® 586, Joncryl® ECO 675, Joncryl® 678, Joncryl® 680, Joncryl® 683, Joncryl® 693 available from by BASF.

In some embodiments, the ink composition contains water-dispersible polymer waxes that are present in an amount ranging from about 0.1 to about 3 wt % based on the total weight of the ink composition. Water-dispersible polymer waxes can also be present in an amount ranging from about 0.5 to about 3 wt % of the total weight of the ink composition. In some examples, the water-dispersible polymer waxes are water-dispersible polyolefin-paraffin wax emulsions. The water-dispersible polymer waxes are mainly hydrophobic in nature. Such water-dispersible polymer waxes are present in the ink in the form of an emulsion. Water-dispersible polymer waxes can be any synthetic or natural wax that can be dispersed in water. Non-limiting examples of natural waxes used include beeswax, lanolin, lancerin, sheelac, ozokerite, carnauba, candellila, jojoba, bayberry, rice bran, peat, ouricouri, monton, paraffin, and/or microcrystalline waxes. Non-limiting examples of synthetic waxes that can be used include fatty acid amides, PTFE, fatty alcohols, polyamides, and combinations thereof. In some examples, the water-dispersible polymer waxes include, but are not limited to, water-dispersible wax emulsions of the "Joncryl® Wax" family (such Joncryl® Wax 120, Joncryl® Wax 26, Joncryl® Wax 28, etc.) made by BASF.

In some embodiments, the ink composition, containing from about 0.1 to about 10 wt % of metal oxide pigment particles, having an average particle size in the range of about 3 to about 300 nm, that are dispersed with polyether alkoxysilane dispersants; and from about 0.01 to about 3 wt % of water-soluble amphiphilic polymers or of water-dispersible polymer waxes, is applied onto a printable media. Said printable media contains a bottom supporting substrate and an ink-absorbing layer. Said printable media can contain a porous glossy layer. The ink-absorbing layer, of the printable media, and glossy layer when present, may have pore diameters smaller than the size of the metal oxide pigment particles. A method for forming a printed article with metallic appearance encompasses: providing an ink composition that contains an ink composition having from about 0.1 to about 10 wt % of metal oxide pigment particles that have an average particle size in the range of about 3 to about 300 nm and that are dispersed with polyether alkoxysilane dispersants; and from about 0.01 to about 3 wt % of water-soluble amphiphilic polymers or of water-dispersible polymer waxes; providing a printable media, that contains a bottom supporting substrate and an ink-absorbing layer; and jetting said ink composition onto said printable media to form a printed feature with metallic appearance. When the ink composition, such as described above, is applied to the printable media, the liquid phase of the ink composition penetrates through the pores of the glossy layer, when present, and further into the ink-absorbing layer. The metal particles cannot penetrate through the surface pores and are retained on top of the media. The printable media is thus capable of receiving a printed feature that includes metal oxide pigment particles, such as $Fe_3O_4$, that have an average particle size smaller than about 300 nm. In some examples, the media has a multilayered structure and is capable of producing gold-luster prints when being printed with the above described ink formulation. In some examples, the projection of the stream of droplets of ink composition, onto the printable media, is done via inkjet printing technique. The ink composition may be established on the material via any suitable printing technique. Non-limitative examples of such printing technique include thermal, acoustic, continuous and piezoelectric inkjet printing.

After jetting, the particles of the ink composition aggregate on the media surface of the printable substrate and form a layer of desired reflectivity and appearance: the printed feature. The resulting printed article encompasses a uniform coating layer that exhibits a metallic luster and, when printed with $Fe_3O_4$ pigment particles, a gold-like appearance. Such printed article has, thus, a metallic appearance and contains a printable media, on which a printed feature is formed with an ink composition. Said ink contains from about 0.1 to about 10 wt % of metal oxide pigment particles, having an average particle size in the range of about 3 to about 300 nm, dispersed with polyether alkoxysilane dispersants, and from about 0.01 to about 3 wt % of water-soluble amphiphilic polymers or of water-dispersible polymer waxes. The printable media contains a supporting substrate and an ink-absorbing layer with pore diameters smaller than the size of the metal oxide pigment particles. In some examples, the printable media is a glossy porous inkjet photopaper.

Figure 2:
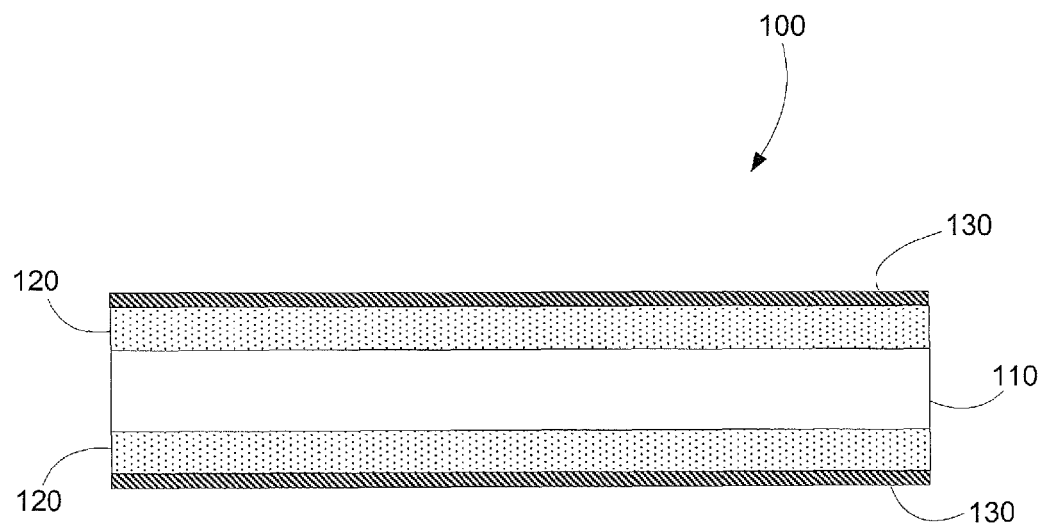
Figure 3:
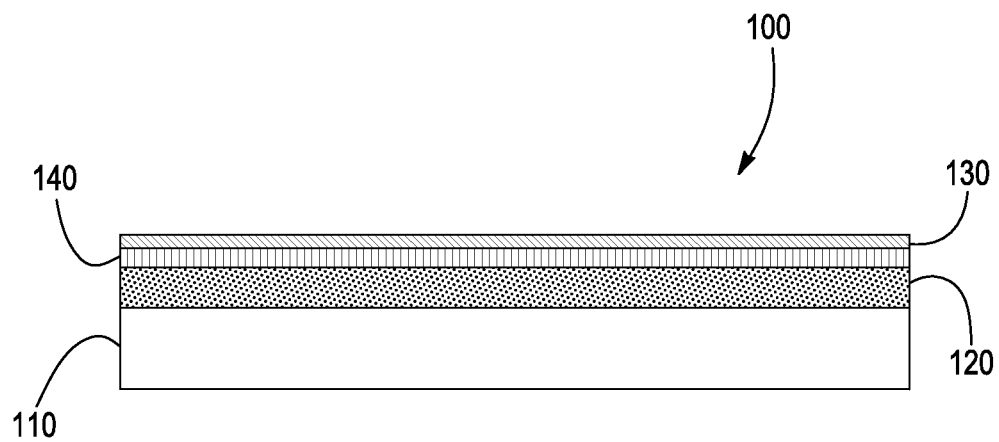
Figure 4:
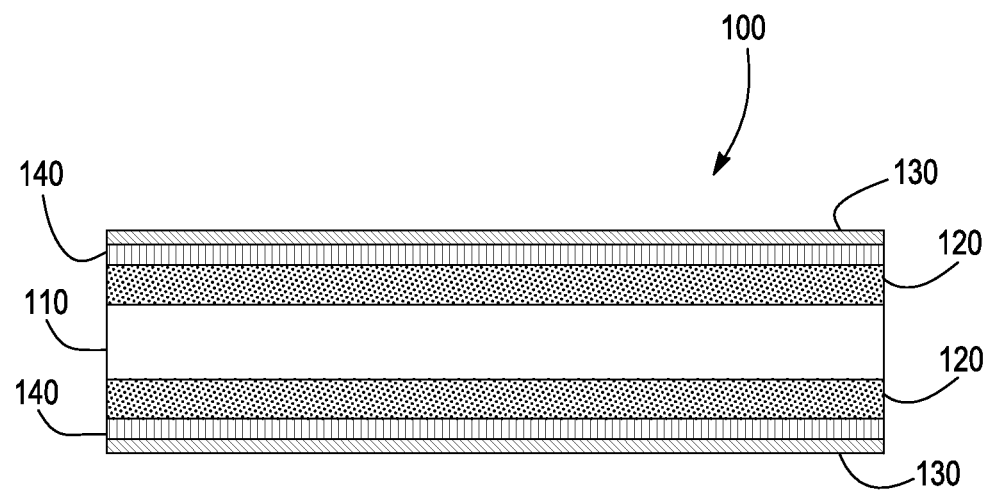

In some examples, such as illustrated in FIGS. 1 and 2, the printed article (100) contains a printed feature (130), made with the ink composition such as described above, and a printable media that encompasses an ink-absorbing layer (120) and a bottom supporting substrate (110). Such as illustrated in FIG. 1, the printed feature (130) and the ink-absorbing layer (120) can be applied to only one side of the supporting substrate (110). Such as illustrated in FIG. 2, the printed feature (130) and the ink-absorbing layer (120) can be applied to both opposing sides of the supporting substrate (110). In some other examples, as illustrated in FIGS. 3 and 4, the printed article (100) contains a printed feature (130), made with the ink composition such as described above, and a printable media that encompasses a supporting substrate (110), an ink-absorbing layer (120) applied to, at least, one surface of said substrate (110) and a glossy porous protective layer (140) applied over the ink-absorbing layer (120). Such as illustrated in FIG. 3, the glossy porous protective layer (140) and the ink-absorbing layer (120) are applied to only one side of the supporting substrate (110). As illustrated in FIG. 4, the printable media can encompass a glossy porous protective layer (140) and an ink-absorbing layer (120) that are applied to both opposing sides of the supporting substrate (110). The printed feature (130) can thus be applied to both sides of the media. The printed article (100), such as defined herein, is a printable media on which a printed feature (130) is formed using printing techniques. The ink composition, containing from about 0.1 to about 10 wt % of metal oxide pigment particles, having an average particle size in the range of about 3 to about 300 nm, dispersed with polyether alkoxysilane dispersants, and from about 0.01 to about 3 wt % of water-soluble amphiphilic polymers or of water-dispersible polymer waxes; forms, onto the above-mentioned printable media, a printed feature (130) that can be considered as a metal coating. Said printed feature is, indeed, a uniform coating with strong sparkling and metallic reflective appearance. The printed feature (130) can have a thickness that is between about 40 and about 600 nm or that is between about 50 and about 400 nm. In some examples, the printed feature (130) has a density or, metal oxide pigment particles coverage, in the range about 3 to about 80 µg/cm².

The printed article, as disclosed herein, can be useful for forming printed images that have, for examples, decorative applications, such as greeting cards, scrapbooks, brochures, signboards, book covers, wall paper, business cards, certificates, packaging and other similar applications.

The supporting substrate (110) of the printed article (100) can be of any type and size and can be any material that will be able to provide a mechanical support to the above-mentioned layers. The supporting substrate can be a flexible film or a rigid paper substrate. In some examples, the supporting substrate includes any substrate that is suitable for use in digital color imaging devices, such as electrophotographic and/or inkjet imaging devices, including, but in no way limiting to, resin coated papers (so-called photobase papers), papers, overhead projector plastics, coated papers, fabrics, art papers (e.g. water color paper), plastic film of any kind and the like. In some other examples, the supporting substrate is paper (non-limitative examples of which include plain copy paper or papers having recycled fibers therein) or photopaper (non-limitative examples of which include polyethylene or polypropylene extruded on one or both sides of paper), and/or combinations thereof. In yet some other examples, the supporting substrate is a photobase.

The printable article (100) contains an ink-absorbing layer (120). This layer (120) is a porous ink-absorbing layer that can have a coat-weight in the range of about 10 to 40 g/m².

Said ink-absorbing layer (120) has an absorption capacity (porosity) ranging from about 0.6 to about 1.2 liter/gram. The ink-absorbing layer (120) is a porous layer having pore diameters that are smaller than the diameters of metal oxide pigment particles that are part of the ink composition applied to form the printed feature (130). The ink-absorbing layer can contain inorganic pigments in particulate form and at least one binder. In some examples, the printable media can include a glossy porous protective layer (140). Said glossy layer can be applied over the ink-absorbing layer. The glossy protective layer can contain inorganic colloidal particles such as colloidal particulates of metal oxides and semi-metal oxides or colloidal silica particles and water-soluble binder, such as polyvinylalcohol or co-polymers of vinylpyrrolidone.

The preceding description has been presented to illustrate and describe some embodiments of the disclosure. However, it is to be understood that the following examples are only illustrative of the application of the principles of the present ink composition, printed article and methods.

EXAMPLE 1

Ink Preparation

Ink compositions are prepared based on metal oxide dispersions, containing $Fe_3O_4$ nano-particles. Such metal oxide dispersion is produced by milling metal oxide pigment nano-particles ($Fe_3O_4$ powder available from "Inframat Advanced Materials") in a Kotobuki Ultra-Apex Bead Mill (UAM-015) with a dispersant. The milling dispersant used is Silquest® A-1230 (available from Momentive Performance Materials) at a dispersant/metal oxide pigment particles ratio equal to 0.5. The resulting dispersion contains about 5.5 wt % of metal oxide pigment particles ($Fe_3O_4$ particles). The average particle size of $Fe_3O_4$ particles is about 32 nm (as measured by "Nanotrac" particle size analyzer). The dispersion is then used to produce the ink compositions such as described in the table below. The ink formulations are illustrated in the TABLE (a) below. All percentages are expressed in wt % of the total composition.

LEG-1 is a co-solvent available from Liponics. Trizma® Base is available from Sigma Aldrich Inc. Proxel® GXL is a biocide available from Avecia Inc. Surfynol® 465 is a surfactant available from Air Products. Joncryl® 683 is a co-polymer of styrene, alpha methyl styrene and acrylic acid, available from BASF. Joncryl® Wax 120 is a polyethylene/paraffin available from BASF. Polyurethane (a) is a polyurethane additives (water-soluble amphiphilic polymers) having an acid number of about 53 mg/g KOH. Polyurethane (b) is a polyurethane additives (water-soluble amphiphilic polymers) having an acid number of about 60 mg/g KOH.

EXAMPLES 2

Ink Performances

Printed articles with metallic appearance are produced by applying ink formulations #1 to #6 (as described in example 1) onto the surface of printable media by means of a thermal inkjet printhead. Prints with metallic appearance are produced by jetting the above described ink compositions, on a "HP Advanced Photo Paper", using a HP Cartridge 940 in a HP Office Jet Pro 8000 printer. The resulting printed articles have a gold-like visual appearance and have a specific reflectivity (as measured by BYK "Micro-Tri-Gloss meter") as illustrated in TABLE (b). All printed articles have a printed feature containing $Fe_3O_4$ particles with a coverage in the range of about 5 to about 30 µg/cm².

TABLE (b)

| | Formulation # | | | | | |
|---|---|---|---|---|---|---|
| | 1 Control | 2 PU (a) | 3 PU (b) | 4 Joncryl 683 | 5 Jonwax120 | 6 Jonwax120 |
| % Reflectivity at 20° | 16.4 | 15.3 | 15.5 | 16.0 | 15.2 | 13.0 |

One hour after printing, printed articles are subjected to water damage tests. Water resistance is determined using the ISO water resistance testing method ISO/DIS 18935:2005 (E). Waterfastness tests are performed by dripping water along the print surfaces and by a subsequent visual inspection. Such test includes printing bars with metallic gold appearance, separated by unprinted spaces; placing the printed paper on a clipboard supported at 45 degrees; dripping 0.25 ml of water on the printed media; and measuring transfer of color between printed bars and the unprinted spaces. The waterfastness performance is scored visually on a scale of 1 to TABLE (a)

| | Formulation # | | | | | |
|---|---|---|---|---|---|---|
| | 1 Control | 2 PU (a) | 3 PU (b) | 4 Joncryl 683 | 5 Jonwax120 | 6 Jonwax120 |
| $Fe_3O_4$ | 36.20 | 36.20 | 36.20 | 36.20 | 36.20 | 36.20 |
| LEG-1 | 5.00 | 5.00 | 5.00 | 5.00 | 5.00 | 5.00 |
| 2-Pyrrolidinone | 9.00 | 9.00 | 9.00 | 9.00 | 9.00 | 9.00 |
| Trizma ® Base | 0.20 | 0.20 | 0.20 | 0.20 | 0.20 | 0.20 |
| Proxel ® GXL | 0.10 | 0.10 | 0.10 | 0.10 | 0.10 | 0.10 |
| Surfynol ® 465 | 0.20 | 0.20 | 0.20 | 0.20 | 0.20 | 0.20 |
| Polyurethane (a) | — | 0.10 | — | — | — | — |
| Polyurethane (b) | — | — | 0.10 | — | — | — |
| Joncryl ® 683 | — | — | — | 0.10 | — | — |
| Joncryl ® wax 120 | — | — | — | — | 0.30 | 1.00 |
| Water | Up to 100% | Up to 100% | Up to 100% | Up to 100% | Up to 100% | Up to 100% |

5 where a score of 1 illustrates a very poor water resistance, a score of 2 illustrates a poor water resistance, a score of 3 illustrates a fair water resistance, a score of 4 illustrates a good water resistance and a score of 5 illustrates a very good water resistance. Results are illustrated in the TABLE (c) below.

Such results demonstrate excellent improvement in waterfastness of printed articles made with inks containing water-soluble amphiphilic polymers additives (Ink formulations #2, #3 and #4). In absence of polymer additives (Ink formulation 1), the metal oxide printed articles is immediately damaged by dripping water. Furthermore, the test with ink formulations #5 and #6 illustrates that only certain amounts of water-dispersible polymer waxes improve waterfastness of metal oxide printed articles.

TABLE (c)

| | Formulation # | | | | |
|---|---|---|---|---|---|
| | 1-Control | 2-PU (a) | 3-PU (b) | 4-Joncryl 683 | 5-Jonwax120 | 6-Jonwax120 |
| Result of the test | 1 | 5 | 5 | 4 | 2 | 5 |

EXAMPLE 3

Contact Angles Measurements

Water Dynamic Contact Angle measurements are measured on the surface of printed articles having a printed feature produced by ink formulations # 2 and #3 (i.e. containing, respectively, polyurethane (a) and (b)). Water is applied to the surface of said printed articles and a Contact Angle System is used to measure contact angle of the droplet on the print surface. Contact angles are measured with a FTA 200 instrument (Manufactured by First Ten Angstroms). A computer-controlled camera captures images of the droplet, on the surface, at predetermined time intervals (from 0.1 millisecond to 20 seconds). The 5.2 to 8.1 second range is chosen to average as representative of the contact angle for each sample.

The water contact angle is a measure of the degree of repellency of a surface (The greater the contact angle, the greater the repellency is). See "Chemistry and Physics of Interfaces," A. M. Schwartz, American Chemical Society, 1971. If the measured contact angle is greater than about 90 degree, the surface is considered very hydrophobic, but lesser contact angle values, and, specifically, values greater than about 25 degree, confer adequate repellency and protection. Conversely, a contact angle of less than about 15 degree indicates a highly wettable and ink-receptive surface, but one that is also subject to damage by water (and is therefore not durable).

Figure 5:
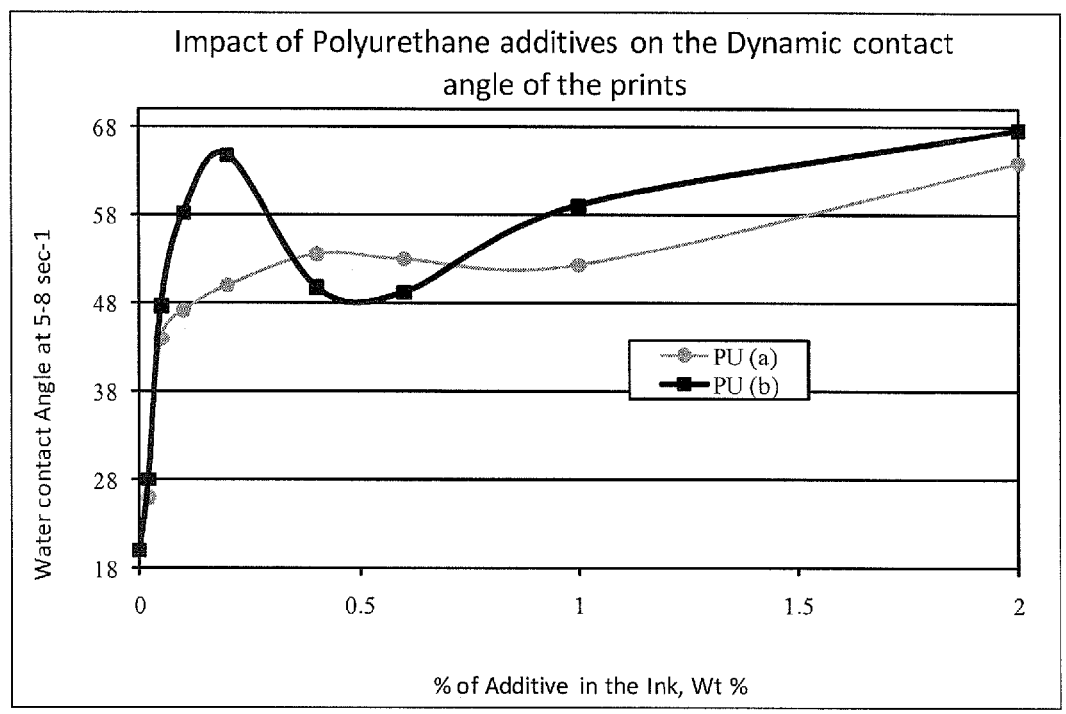
FIG. 5 is a graph illustrating the impact of polymers, onto the contact angle of the printed articles, printed using the ink composition according to some embodiments of the present disclosure.

Such as illustrated in the graph of FIG. 5, the presence of polyurethane additives in the ink formulation used to produces a printed article, results in printed articles having water contact angles that are more than about 45 degree. This measurement demonstrates, thus, that printed articles, produced with ink formulations #2 and # 3, exhibit good resistance to water. The results demonstrate also that about 0.05 to about 0.2 wt % of water-soluble amphiphilic polymers, present in the ink composition, could be enough to convert hydrophilic surface of the printed article into water-repellent one. The printed articles are thus more durable and are water repellant.

Furthermore, the water dynamic contact angle measurement of printed articles having a printed feature produced by ink formulation # 1 (comparative ink formulation) is also shown in FIG. 5 (at 0 wt % of additives) and is of about 20 degrees. Contact angle measurement of printed media per se, that do not have any printed feature, is of about 37 degrees. This result demonstrates, thus, that printed articles, having a printed feature produced with the ink formulation #1, have surfaces that are even more hydrophilic than the media are by themselves (i.e. without printed feature). The addition of water-soluble amphiphilic polymers additives to the ink composition, which is used for producing the printed feature of the printed article, increases the contact angle. The surface of the printed article is, thus, becoming more hydrophobic, improving therefore the waterfastness properties.

The invention claimed is:

1. An ink composition comprising from about 0.1 to about 10 wt % of metal oxide pigment particles, having an average particle size in the range of about 3 to about 300 nm, dispersed with polyether alkoxysilane dispersants and from about 0.1 to about 3 wt % of water-dispersible polymer waxes, based on the total weight of the ink composition.

2. The ink composition, according to claim 1, wherein the metal oxide pigment particles have an average particle size in the range of about 5 to about 150 nm.

3. The ink composition, according to claim 1, wherein the metal oxide pigment particles are selected from the group consisting of titanium dioxide ($TiO_2$), zinc oxide (ZnO), indium oxide ($In_2O_3$), manganese oxide ($Mn_3O_4$) and iron oxide ($Fe_3O_4$).

4. The ink composition, according to claim 1, wherein the metal oxide pigment particles are iron oxide ($Fe_3O_4$) particles.

5. An ink composition comprising from about 0.1 to about 10 wt % of metal oxide pigment particles, having an average particle size in the range of about 3 to about 300 nm, dispersed with polyether alkoxysilane dispersants and from about 0.01 to about 3 wt % of water-dispersible polymer waxes, based on the total weight of the ink composition, wherein the water-dispersible polymer waxes are water-dispersible polyolefin-paraffin wax emulsions.

6. The ink composition, according to claim 5, wherein the metal oxide pigment particles are selected from the group consisting of titanium dioxide ($TiO_2$), zinc oxide (ZnO), indium oxide ($In_2O_3$), manganese oxide ($Mn_3O_4$) and iron oxide ($Fe_3O_4$).

7. An ink composition comprising from about 0.1 to about 10 wt % of metal oxide pigment particles, having an average particle size in the range of about 3 to about 300 nm, dispersed with polyether alkoxysilane dispersants and from about 0.01 to about 3 wt % of water-soluble amphiphilic polymers, based on the total weight of the ink composition, wherein the water-soluble amphiphilic polymers are water-soluble amphiphilic polyurethane polymers additives having an average molecular weight ranging from about 5,000 to about 100,000 and an acid number in the range of about 30 to about 75 mg KOH/g polymer.

8. The ink composition, according to claim 7, wherein the water-soluble amphiphilic polymers are present in an amount ranging from about 0.01 to about 1 wt % of the total weight of the ink composition.

9. The ink composition, according to claim 7, wherein the metal oxide pigment particles are selected from the group consisting of titanium dioxide ($TiO_2$), zinc oxide (ZnO), indium oxide ($In_2O_3$), manganese oxide ($Mn_3O_4$) and iron oxide ($Fe_3O_4$).

10. A printed article with metallic appearance comprising a printable media on which a printed feature is formed with an ink composition; said ink composition contains from about 0.1 to about 10 wt % of metal oxide pigment particles, having an average particle size in the range of about 3 to about 300 nm, dispersed with polyether alkoxysilane dispersants, and from about 0.01 to about 3 wt % of water-soluble amphiphilic polymers or of water-dispersible polymer waxes; said printable media encompasses a supporting substrate and an ink-absorbing layer with pore diameters smaller than the size of the metal oxide pigment particles.

11. The printed article, according to claim 10, wherein the ink composition forms, onto the printable media, a printed feature with a thickness in the range of about 40 nm to about 600 nm.

12. The printed article, according to claim 10, wherein the printable media is a glossy porous inkjet photopaper.

13. The printed article, according to claim 10, wherein the water-dispersible polymer waxes are water-dispersible polyolefin-paraffin wax emulsions.

14. The printed article, according to claim 10, wherein the water-soluble amphiphilic polymers are water-soluble amphiphilic polyurethane polymers additives having an average molecular weight ranging from about 5,000 to about 100,000 and an acid number in the range of about 30 to about 75 mg KOH/g polymer.

15. The printed article, according to claim 10, wherein the metal oxide pigment particles are selected from the group consisting of titanium dioxide ($TiO_2$), zinc oxide (ZnO), indium oxide ($In_2O_3$), manganese oxide ($Mn_3O_4$) and iron oxide ($Fe_3O_4$).

16. The printed article, according to claim 10, wherein the water-soluble amphiphilic polymers are any of polyurethane polymers additives or styrene-acrylate co-polymers additives.

17. A method for forming a printed article with metallic appearance comprising:
   a. providing an ink composition containing from about 0.1 to about 10 wt of metal oxide pigment particles, having an average particle size in the range of about 3 to about 300 nm, dispersed with polyether alkoxysilane dispersants, and from about 0.01 to about 3 wt of water-soluble amphiphilic polymers or of water-dispersible polymer waxes;
   b. providing a printable media having a supporting substrate and an ink-absorbing layer with pore diameters smaller than the size of the metal oxide pigment particles;
   c. and jetting said ink composition onto said printable media.

18. The method for forming a printed article, according to claim 17, wherein the ink composition is applied onto the printable media via an inkjet printing technique.

* * * * *

UNITED STATES PATENT AND TRADEMARK OFFICE
CERTIFICATE OF CORRECTION

PATENT NO. : 8,454,737 B2  
APPLICATION NO. : 13/230789  
DATED : June 4, 2013  
INVENTOR(S) : Vladek Kasperchik et al.

Page 1 of 1

It is certified that error appears in the above-identified patent and that said Letters Patent is hereby corrected as shown below:

On the Title page, Item (75), Inventors, in column 1, line 2,
delete "Jayprakash C. Bhalt," and insert -- Jayprakash C. Bhatt, --, therefor.

In the Claims

In column 14, line 14, in Claim 17, delete "wt" and insert -- wt % --, therefor.

In column 14, line 17, in Claim 17, delete "wt" and insert -- wt % --, therefor.

Signed and Sealed this  
Twenty-sixth Day of November, 2013

Margaret A. Focarino  
*Commissioner for Patents of the United States Patent and Trademark Office*